United States Patent [19]

Brueschke et al.

[11] Patent Number: 5,385,647
[45] Date of Patent: Jan. 31, 1995

[54] PROCESS FOR THE REDUCTION OF THE ALCOHOL CONTENT OF ALCOHOLIC BEVERAGES

[75] Inventors: Hartmut E. A. Brueschke, Nussloch; Walter H. Schneider, Dossenheim; Guenter F. Tusel, Homburg/Saar, all of Germany

[73] Assignee: Deutsche Carbone AG, Neunkirchen/Heinitz, Germany

[21] Appl. No.: 7,258

[22] Filed: Jan. 21, 1993

Related U.S. Application Data

[60] Division of Ser. No. 701,187, May 16, 1991, abandoned, which is a continuation of Ser. No. 308,800, Feb. 9, 1989, abandoned.

[30] Foreign Application Priority Data

Feb. 11, 1988 [DE] Germany .................... 3804236

[51] Int. Cl.$^6$ .................... B01D 3/00; B01D 13/00; A23L 2/08
[52] U.S. Cl. .................... 203/39; 159/DIG. 27; 203/87; 210/638; 210/640; 210/500.27; 210/651; 426/387; 426/493; 426/494; 426/592
[58] Field of Search .................... 203/39, 87; 202/205, 202/186; 210/651, 500.27, 638, 640, 644, 641; 426/493, 494, 387, 592, 11, 14, 15; 159/DIG. 27, DIG. 28

[56] References Cited

U.S. PATENT DOCUMENTS

| | | | |
|---|---|---|---|
| 4,422,903 | 12/1983 | Hessick et al. | 203/39 |
| 4,455,198 | 6/1984 | Zudkevitch et al. | 203/39 |
| 4,612,196 | 9/1986 | Goldstein et al. | 426/592 |
| 4,612,196 | 9/1986 | Goldstein et al. | 426/14 |
| 4,617,127 | 10/1986 | Light | 210/651 |
| 4,619,639 | 10/1986 | Nosé et al. | 210/651 |
| 4,626,437 | 12/1986 | Schobinger et al. | 426/494 |
| 4,717,482 | 1/1988 | Light | 210/651 |
| 4,728,429 | 3/1988 | Cabasso et al. | 210/638 |
| 4,728,429 | 3/1988 | Cabasso et al. | 210/638 |
| 4,755,299 | 7/1988 | Brüschke | 210/640 |
| 4,769,140 | 9/1988 | van Dijk et al. | 210/184 |
| 4,792,402 | 12/1988 | Fricker | 210/651 |
| 4,816,407 | 3/1989 | Matson | 426/16 |
| 4,816,407 | 3/1989 | Matson | 435/287 |
| 4,894,163 | 1/1990 | Watanabe et al. | 210/640 |
| 4,908,219 | 3/1990 | Modot et al. | 426/494 |
| 4,925,562 | 5/1990 | te Hennepe et al. | 210/500 |
| 4,933,198 | 6/1990 | Lee et al. | 426/319 |
| 4,936,954 | 6/1990 | Sander | 202/172 |
| 4,944,881 | 7/1990 | Michizuki et al. | 159/DIG. 27 |
| 4,988,525 | 1/1991 | Gresch | 426/493 |

FOREIGN PATENT DOCUMENTS

| | | | |
|---|---|---|---|
| 0254758 | 2/1988 | European Pat. Off. | B01D 13/04 |
| 3610011 | 10/1987 | Germany | B01D 17/00 |

OTHER PUBLICATIONS

Aptel et al., "Application of the Pervaporation Process to Separate Azeotropic Mixtures", Journal of Membrane Science, (1976), pp. 271–287.
Wucherpfennig et al., "Herstellung entalkoholisierter Weine", Die Wienwirtschaft Technik, Nr. 9, 12 Sep. 1986, pp. 346—354.
Von K. Wucherpfennig, K. D. Millies, and M. Christmann, "Herstellung entalkoholisierter Weine", published in Die Weinwirtschaft Technik, Nr. 9 (Sep. 12, 1986), pp. 346-354, Germany.
Dr. Ing U. Hochberg, "Bier-entalkoholisierung durch Verdampfung", published in Brauindustrie, 71 (1986), pp. 480–485, Germany.
P. Aptel, et al., "Application of the Pervaporation Process to Separate Azeotropic Mixtures", published in The Journal of Natural Science, 1 (1976), pp. 271–287.
V. Shantora and R. Y. M. Huang, "Separation of Liquid Mixtures by Using Polymer Membranes", published in Journal of Applied Polymer Science, vol. 26 (1981), pp. 3223–3243.
Dr. Herbert Buckenhüskes, papers of the VLT seminar "Trenntechniken" held Feb. 19–20, 1987, in Flein, Germany, Scientific Publication, Verband der Lebensmitteltechnologen e.V. (Union of the Food Technologists), Esslinger Str. 72, D-7024 Filderstadt, pp. 107–119.
J. Kaschemekat et al., "Konzentrierung von Ethanol durch Pervaporation", published in Chem.-Ing.-Tech, 58 (1986), pp. 740–742, Germany.

*Primary Examiner*—Virginia Manoharan
*Attorney, Agent, or Firm*—Arnold, White & Durkee

[57] ABSTRACT

A process for reducing the alcohol content of alcohol-containing beverages, in particular of beer or wine, wherein the alcohol is partially or completely removed by way of pervaporation.

11 Claims, 1 Drawing Sheet

PROCESS FOR THE REDUCTION OF THE ALCOHOL CONTENT OF ALCOHOLIC BEVERAGES

This application is a division of application Ser. No. 07/701,187, filed May 16, 1991, which is a continuation of abandoned application Ser. No. 07/308,800, filed Feb. 9, 1989, entitled A PROCESS FOR THE REDUCTION OF THE ALCOHOL CONTENT OF ALCOHOLIC BEVERAGES in the names of Hartmut Ernst Arthur Brueschke, Walter Schneider and Guenter F. Tusel.

FIELD OF THE INVENTION

This invention relates to a process for the reduction by pervaporation of the alcohol content of alcoholic beverages, in particular of beer and wine.

BACKGROUND OF THE INVENTION

During the last years, there has been an increasing demand for alcoholic beverages with reduced alcohol content, in particular beer and wine. At the same time the taste of these beverages should be maintained as far as possible so as not to be distinguishable from the taste of the beverages with the original alcohol content. Hereinafter the term low-alcohol beverages will be used for beverages with reduced alcohol content.

There are several reasons for the increased demand for low-alcohol beverages. First it is to be noted that the reduction of the alcohol content causes a reduction of the calorie content. This means that low-alcohol beverages can also be enjoyed by those people who are on diet for health reasons or who must not drink conventional alcoholic beverages for other reasons. Furthermore, the number of traffic accidents due to alcohol has led to an increase of traffic checks and punishments as well as to an increased awareness concerning the influence of alcohol on traffic. The danger due to alcohol can be reduced by low-alcohol beverages without substantially changing the drinking habits.

There have been quite some efforts to use the conventional processes for the separation of alcohol and ethanol, respectively, from its aqueous solutions and also for the reduction of the alcohol content of alcoholic beverages.

It is essential for the success of such a process that—apart from the desired reduction of the content of alcohol—no other changes occur in the beverage, in particular with respect to taste, appearance, and well keeping.

As a more volatile component, ethanol can be distilled off from alcoholic beverages, like wine or beer, so that the ethanol content of the beverage can be reduced. Such a process has been described, for example for beer, in Brauereiindustrie 71 (1986), page 480. The distillation must be carried out at low temperature and thus under reduced pressure to preserve the heat-sensitive constituents of the beer. Under these conditions, besides ethanol, other substances which are important for the taste, are removed depending on their volatility as well, so that a change in taste cannot be avoided. Furthermore, the required temperatures will cause a denaturation of the protein components leading to a change of taste and appearance of the low-alcohol beer as well. Further, the distillation under reduced pressure removes free carbon dioxide from the beer, which carbon dioxide must be recompressed and recycled. The technical equipment required and the costs for such a vacuum distillation are high without eventually yielding a satisfactory result.

Another process for the reduction of the content of alcohol in alcoholic beverages is described in Weinwirtschaft, Tech. 9 (1986), page 346. In a dialysis process the liquid, the alcohol content of which is to be reduced, is fed across one side of a porous dialysis membrane, while an alcohol-absorbing liquid, for example water, flows at the other side of the membrane. Alcohol diffuses from the alcoholic phase, for example wine, into the absorbing liquid according to the concentration difference. However, because for all components of the wine there exists a corresponding concentration difference across the membrane, these components diffuse along with the alcohol, so that such a process causes a loss of taste substances as well. A further disadvantage resides in that the absorbing liquid (dialysate) is obtained with a very low alcohol content and can hardly be commercially used or disposed of.

Another process for alcohol reduction is described in U.S. Pat. No. 4,617,127 and EP-A-0 162 240 taking advantage of the fact that membranes for reverse osmosis having a salt retention capacity, for example for sodium chloride, of more than 97%, have a retention capacity for ethanol of less than 90%. If beer or wine having an alcohol content of 4% or 10%, respectively, is subjected to the process of reverse osmosis, a permeate is obtained on the one hand consisting essentially of water and some alcohol, as well as a retained material (retentate) on the other hand having a higher alcohol concentration than the original beverage. A product having an alcohol content less than the alcohol content of the original beverage is obtained if the retentate is rediluted with pure water to the original volume. Disadvantages with this process are also, that under the influence of the high pressure required a denaturation of taste substances occurs and that, besides alcohol and water, other taste substances permeate through the membrane thus being lost. Further, an alcoholic solution of low concentration is obtained as permeate, which must be processed or disposed of. Despite all these disadvantages this process of reverse osmosis is used in large scale operation emphasizing the need for a better process.

These problems lead directly to the object of the invention, the solution of which is defined in claim 1.

SUMMARY OF THE INVENTION

Accordingly, the invention relates to a process for reducing the alcohol content of alcohol-containing beverages, in particular beer or wine, wherein the alcohol is partially or completely removed by pervaporation.

In the process of the invention the original alcohol-containing beverage, for example beer or wine, is fed to the feed side of a pervaporation membrane. On the permeate side of the membrane the partial pressure of the alcohol is, for example by applying vacuum and/or a lower condensation temperature, so much reduced that a significant partial pressure gradient exists for the alcohol between the feed side and the permeate side of the membrane. This partial pressure gradient causes the alcohol to permeate across the membrane and to enter the permeate side as vapor. This vapor can be removed, for example, with a vacuum pump, or condensed by a condenser, which continuously guarantees a sufficient partial pressure gradient.

The separated alcohol is obtained in the permeate at a concentration, which is considerably higher than the concentration in the original alcoholic beverage thereby obtaining a directly useful product as permeate, which additionally can be concentrated to obtain pure alcohol.

Unlike the above described vacuum distillation, the process of the invention is not dependent on certain minimum temperatures. Rather, the process temperature can be considerably further reduced, depending on the degree or temperature sensitivity of alcohol content of the original alcoholic beverage, so that temperature damages can be safely avoided. The process of the invention is generally carried out at temperatures of 0° to 80° C., preferably 20° to 45° C., wherein temperatures of 30° to 40 ° C. are particularly preferred. The process is carried out at either atmospheric pressure or slightly increased pressure. The latter is especially recommended for beverages which contain carbon dioxide, such as beer, to avoid release of free carbon dioxide. Typical process pressures vary in the range of 1 to 5 bar. Higher pressures can cause sealing problems.

The pressure at the permeate side is primarily determined by the condensation temperature of the permeate. The pressure at the permeate side typically varies between 0.5 and 50 mbar, and preferably from 10 to 30 mbar.

Subsequent to the permeation the condensation of the permeate occurs. Although the lower limit of the condensation temperature is not critical it is limited by practical factors. A typical range is from 0° to −70° C.

In accordance with the invention any pervaporation membrane is suitable which has a higher permeation capability for alcohol (ethanol) than for water. A suitable membrane is, for example, made of crosslinked polyvinyl alcohol such as described in DE-A 3 220 570. A preferred group of membranes is made of silicones, particularly of polydimethyl siloxane. From the latter those polydimethyl siloxanes are preferred which, besides methyl groups, also contain larger and/or partially fluorinated or perfluorinated alkyl- or aryl substituents bound to silicon atoms as side chains. Another preferred class of membranes is described in EP-A-0 254 758, which are membranes of mixtures of hydrophobic inorganic materials, such as silicalites, and polysiloxanes. Membranes having ion-exchanging properties, for example anion-exchanging membranes, are suitable for the process of the invention as well.

In a preferred embodiment the process of the invention is carried out with stepwise condensation of the permeate, in which a first or main condensation is followed by a second or post condensation, wherein the second condensation in turn can comprise several steps. In fact it has been found that volatile aroma compounds contained in the alcoholic beverage permeate through the membrane. Whereas volatile aroma compounds, depending on the condensation temperature, are obtained in the condensed permeate, they cannot be used in this form. Therefore, in such cases, the condensation part of the process is preferably carried out such that the temperature of the first or main condensation is voluntarily chosen somewhat higher to avoid a condensation of the volatile aroma compounds. Rather, the latter are condensed in concentrated form in a second or post condensation with correspondingly lower condensation temperatures. This concentrated second condensate can then be directly added to the retained material (retentate), so that the original aroma composition of the beverage is maintained.

First or main condensation and second or post condensation are preferably carried out at different pressures, wherein the pressure of the first condensation is typically about 20 mbar, and the second condensation is carried out at higher pressures up to atmospheric pressure.

The usual pervaporation apparatuses can be used for carrying out the process of the invention, wherein the pervaporation membranes are used in the form of so-called membrane modules. The term module designates the construction unit comprising the actual membrane and its holding means. Suitable membrane modules are described in EP-A-0 214 496. One skilled in the art would know other membrane modules, such as tubular membrane modules or spiral-wound modules.

BRIEF DESCRIPTION OF THE DRAWINGS

Hereinafter the process of the invention is described for beer in view of the drawing. The single figure shows the pervaporation apparatus having a membrane module 5, a preheater 2, a first or main condenser 8, a second or post condenser 14 and a vacuum pump 12.

DETAILED DESCRIPTION OF THE INVENTION

Figure 1:
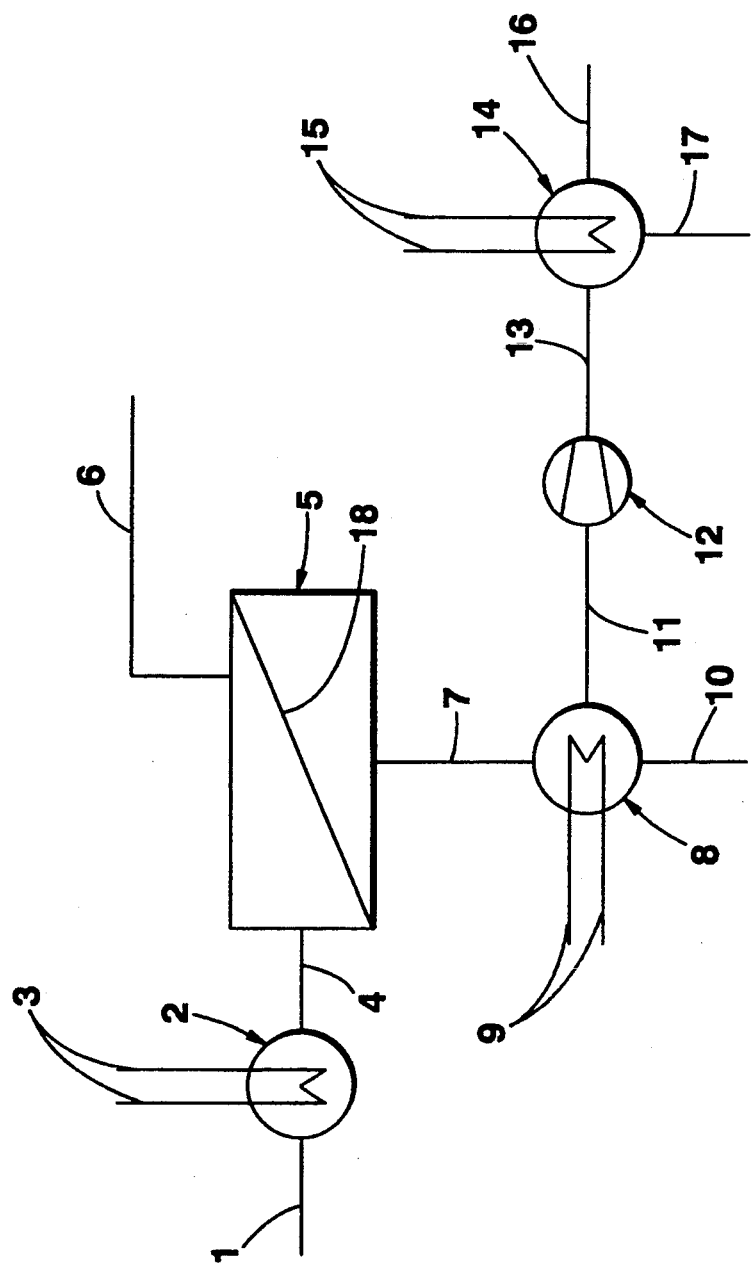

Commercial export beer is fed through a conduit 1 with a pressure of 2.2 bar to avoid release of free carbon dioxide. The pressure is maintained with, for example, a pump (not shown). From preheater 2 where the temperature of the beer is increased to 35° C. by a heater 3 the beer is fed through a conduit 4 into a membrane module 5. The membrane module 5 contains a pervaporation membrane 18 of polydimethyl siloxane containing about 70 weight percent of a hydrophobic zeolite (silicalite). Further process parameters are described in Example 8. The permeate is withdrawn via a conduit 7 and enters a main condenser 8 cooled by a cooling conduit 9 and connected via a conduit 11 with a vacuum pump 12 and a further conduit 13 with a post condenser 14 (one-stage post condensation). In the main condenser 8 the major amount of the permeate is condensed and is withdrawn via conduit 10. The vacuum pump 12 generates the desired reduced pressure of 15 mbar in the main condenser 8.

The post condenser 14 is cooled via a cooling conduit 15, is connected to the atmosphere via a conduit 16 and thus operates at atmospheric pressure. The post condensate is withdrawn via a conduit 17. The ratio of the amounts of condensate obtained in the main and post condenser 8 and 14 is about 200:8. A low-alcohol product having a reduced alcohol content of only 1.7 weight percent is obtained as retentate in membrane module 5 and is withdrawn via conduit 6. This product is added with the post condensate withdrawn from post condenser 14 via conduit 16, which post condensate comprises volatile aroma compounds of beer contributing to the typical desired beer taste. This is followed by redilution with pure water to the original volume to obtain the desired low-alcohol beer having an ethanol content of 1.8 weight percent.

Depending on the actual conditions the above illustrated apparatus can be varied in numerous ways. In practice it is, for example, desirable to subdivide the entire membrane area into several membrane modules, which on the permeate side each lead to the same main condenser. At the retentate side the membrane modules are connected together such that the retentate of the preceding membrane module respectively forms the feed to the next membrane module. If necessary, occurring heat losses are compensated by inserted preheaters.

Furthermore, the post condensation can be carried out in a first step under reduced pressure. The conduit 16 of the figure is then connected with the suction side of a further vacuum pump (not shown), and on the pressure side a further post condenser (not shown) is arranged if necessary. The first post condenser 14 then operates at a pressure between the pressure of the main condenser 8 and atmospheric pressure.

The following examples illustrate the invention.

EXAMPLE 1

5 liters of white wine of German origin having an ethanol content of 9.7 weight percent are used as feed for a pervaporation membrane of crosslinked polyvinyl alcohol. A suitable membrane is described in DE-A-3 220 570. On the feed side the temperature is 45° C., and the pressure is 1.1 bar. On the permeate side the pressure is 20 mbar. That condensation of the permeate is effected at −5° C. (no post condenser). After seven cycles across a membrane area of 0.68 m$^2$, 2.3 liters retentate having an ethanol content of 3.2 weight percent and 2.7 liters permeate having an ethanol content of 15 weight percent are obtained. After having the retentate diluted with 1.7 liters of pure water no change of taste is to be noted in the organoleptic test over the original wine. In the permeate no constituents other than ethanol and water can be analytically determined. Thus the permeate can be directly processed for use.

EXAMPLE 2

5.58 liters of white wine having an alcohol content of 9 weight percent are used. The membrane has a thickness of about 60 μm and consists of thermically crosslinked polydimethyl siloxane. The membrane area is 0.68 m$^2$. At the feed side the temperature is 35° C. and the pressure is 1.1 bar. The pressure at the permeate side is 20 mbar, and the condensation is effected at −5° C. (without post condensation). After four cycles across the membrane 4 liters of low-alcohol product as retentate having an alcohol content of 3.6 weight percent as well as 1.5 liters permeate having an alcohol content of 22 weight percent are obtained. Redilution of the retentate with pure water to the original volume yields the desired low-alcohol wine having an ethanol content of 2.6 weight percent. The organoleptic test does not reveal a difference in taste between the low-alcohol wine and the original wine. The purity of the permeate corresponds to Example 1.

EXAMPLE 3

According to Example 2, 5.5 liters of white wine having an ethanol content of 10.2 weight percent are treated. As pervaporation membrane a sheet of polydimethyl siloxane having a thickness of about 40 μm and an area of 0.68 m$^2$ is used. After four cycles across the membrane 3.8 liters retentate having an ethanol content of 2.8 weight percent as well as 1.6 liters permeate having an ethanol content of 26 weight percent are obtained, which latter is condensed at −7° C. and 15 mbar (without post condensation). Redilution of the retentate with pure water to the original volume yields the desired low-alcohol wine having an ethanol content of 1.9 weight percent. The organoleptic test does not reveal any difference in taste between the low-alcohol wine and the original wine. The purity of the permeate corresponds to example 1.

EXAMPLE 4

5 liters of German white wine of the variety "Morio Muskat" having an ethanol content of 10.2 weight percent are used. The membrane has a thickness of about 60 μm and consists of a polydimethyl siloxane in which a part of the methyl side groups has been replaced by propyl and butyl groups. The membrane area is 0.45 m$^2$. At the feed side the temperature is 35° C. and the pressure is 1.1 bar. On the permeate side the pressure is 15 mbar. The condensation of the permeate is effected at −10° C. (without post condensation). After four cycles across the membrane 4.1 liters retentate having an ethanol content of 3.6 weight percent as well as 0.85 liters permeate having an ethanol content of 42 weight percent are obtained. Dilution of the retentate with 0.9 liters pure water (distilled water with neutral taste) yields the desired low-alcohol wine. The organoleptic test does not reveal a difference in taste between this low-alcohol wine and the original wine. The purity of the permeate corresponds to Example 1. This permeate was drunk by skilled testers as brandy.

EXAMPLE 5

5 liters of French red wine of the variety "Carbernet-Sauvignon" are used. The membrane is the same as described in Example 4. At the feed side the temperature is 30° C. and the pressure is 1.1 bar. After four cycles across the membrane 4.1 liters of low-alcohol product as retentate having an alcohol content of 3.9 weight percent are obtained. At the permeate side the pressure is 20 mbar and the main condensation is effected at −5° C. This yields, as permeate, 0.9 liters main condensate having an alcohol content of 38 weight percent. In addition, a post condensation is carried out at the pressure side of the used vacuum pump at −20° C. and at atmospheric pressure, wherein, as permeate, 10 more grams post condensate having an alcohol content of 80 weight percent are obtained. This post condensate obviously contains wine-aroma compounds, whereas the main condensate does not contain but ethanol and water. Then the low-alcohol product obtained as retentate is added with the post condensate and rediluted with water to the original volume. The obtained low-alcohol wine having an alcohol content of 3.4 weight percent is subjected to the organoleptic test. This test does not reveal any difference in taste over the original wine. The purity of the permeate corresponds to Example 1.

EXAMPLE 6

5.2 liters of white wine having an alcohol content of 10.6 weight percent are used. The membrane is of polydimethyl siloxane containing 70 weight percent of a hydrophobic zeolite (silicalite). The membrane has a thickness of about 60 μm and an area of 0.45 m$^2$. At the feed side the temperature is 40° C. and the pressure is 1.1 bar. After five cycles across the membrane 4.6 liter retentate having an alcohol content of 4.2 weight percent are obtained. At the permeate side the condensation is effected at 20 mbar and −10° C. This yields, as permeate, a main condensate of 0.6 liter having an alcohol content of 58 weight percent. At the pressure side of the vacuum pump, at −25° C. and atmospheric pressure, a further permeate of 10 grams post condensate having an alcohol content of 85 weight percent is obtained. This post condensate obviously contains aroma compounds. The low-alcohol product obtained as retentate is added with this post condensate and then rediluted with water to the original volume. The obtained low-alcohol wine having an alcohol content of 3.9 weight percent is subjected to the organoleptic test. This test does not reveal a difference in taste over the original wine. The purity of the permeate corresponds to Example 1.

EXAMPLE 7

5 liters of export beer having an alcohol content of 4 weight percent are used. The membrane is of polydimethyl siloxane, has a thickness of 50 μm and an area of 0.45 m². At the feed side the temperature is 35° C. and the liquid pressure is 2.2 bar. After three cycles across the membrane 4.5 liters low-alcohol product as retentate having an alcohol content of 1.9 weight percent are obtained. Redilution with pure water to the original volume yields the desired low-alcohol beer having an alcohol content of 1.7 weight percent. The organoleptic test does not reveal a difference in taste over the original beer. At the permeate side the pressure is 15 mbar and the condensation is effected at −7° C. This yields 0.5 liter permeate having an alcohol content of 22 weight percent. The purity of the permeate corresponds to Example 1.

EXAMPLE 8

5 liters of export beer having an alcohol content of 4 weight percent are used. The membrane is the same as described in example 6. At the feed side the temperature is 30° C. and the pressure is 2.2 bar. After one cycle across the membrane 4.8 liters low-alcohol retentate having an alcohol content of 1.7 weight percent are obtained. At the permeate side the pressure is 15 mbar, and the condensation is effected at −7° C. This yields, as permeate, 0.2 liter main condensate having an alcohol content of 47 weight percent. In accordance with Example 5 a post condensation is then carried out at −25° C. and atmospheric pressure, wherein, as further permeate, 8 grams post condensate having an alcohol content of 85 weight percent are obtained. This post condensate obviously contains beer-aroma compounds. The retentate is then added with the post condensate and then rediluted with water to the original volume. The thus obtained low-alcohol beer has an alcohol content of 1.8 weight percent. The organoleptic test does not reveal any difference over the original beer. The purity of the permeate corresponds to Example 1.

EXAMPLE 9

5 liters of export beer having an alcohol content of 4 weight percent are used. The membrane has a thickness of 60 μm and is of polydimethyl siloxane, in which methyl groups are replaced by fluorinated alkyl groups. At the feed side the temperature is 30° C., and the pressure is 2.7 bar. After one cycle across the membrane 4.6 liters low-alcohol product are obtained as retentate having an alcohol content of 0.6 weight percent. At the permeate side the pressure is 15 mbar. The condensation is carried out at −20° C. This yields 0.4 liter condensate having an alcohol content of 42 weight percent. There is no post condensation. After the retentate is rediluted with pure water to the original volume the low-alcohol beer has an alcohol content of 0.5 weight percent. The organoleptic test does not reveal any difference in taste over the original beer. The purity of the permeate corresponds to Example 1.

We claim:

1. A process for reducing the alcohol content of an alcoholic beverage comprising the steps of:
    pervaporating said beverage with a pervaporation membrane to remove at least a portion of the alcohol as a permeate vapor;
    first condensing said permeate vapor at a temperature of about 0° to −30° C. and a pressure of about 0.5 to 50 mbar in a manner to substantially condense the alcohol vapors in said permeate vapor while avoiding substantial condensation of volatile aroma compounds in said permeate vapor;
    further condensing said permeate vapor at a temperature of about −20° to −70° C. and by the use of a multi-step condensation, with each condensation step being carried out at a step-wise increased higher pressure compared to the first condensing step, up to atmospheric pressure, to enable condensation of said aroma compounds; and
    mixing said condensed aroma compounds with the alcohol-reduced retentate of said pervaporation step.

2. The process of claim 1 wherein the temperature of the pervaporation step is maintained at about 0° to 80° C.

3. The process of claim 1 wherein the temperature of the pervaporation step is maintained at about 20° to 45° C.

4. The process of claim 1 wherein the temperature of the pervaporation step is maintained at about 30° to 40° C.

5. The process of claim 1 wherein the pressure of the pervaporation step is maintained at about 1 to 5 bar.

6. The process of claim 1 wherein said condensation steps are accomplished by utilizing at least two different condensers interconnected in series.

7. The process of claim 1 wherein said pervaporation membrane is silicone.

8. The process of claim 7 wherein said membrane further comprises a filter material with a sorption capacity for alcohol sufficient to facilitate the permeation of alcohol across the pervaporation membrane.

9. The process of claim 7 wherein said pervaporation membrane is polysiloxane mixed with a hydrophobic inorganic substance selected from the group consisting of silicates and zeolites.

10. The process of claim 1 wherein the mixture of the alcohol-reduced retentate from the pervaporation step and the condensed aroma compounds is diluted so that the final volume is equal to the original volume of said alcoholic beverage.

11. The process of claim 1 wherein said pervaporation membrane is polydimethyl siloxane or polydimethyl siloxane wherein a pan of the methyl side groups have been replaced by propyl and butyl groups.

* * * * *

UNITED STATES PATENT AND TRADEMARK OFFICE
CERTIFICATE OF CORRECTION

PATENT NO.  : 5,385,647
DATED       : January 31, 1995
INVENTOR(S) : Hartmut E. A. Brueschke; Walter H. Schneider; and Guenter F. Tusel It is certified that error appears in the above-indentified patent and that said Letters Patent is hereby corrected as shown below:

Column 8, line 60, in Claim 11, the word "pan" should read --part--.

Signed and Sealed this

Eighteenth Day of April, 1995

Attest:

BRUCE LEHMAN

*Commissioner of Patents and Trademarks*

*Attesting Officer*